United States Patent [19]

Bateman

[11] Patent Number: 4,574,360
[45] Date of Patent: Mar. 4, 1986

[54] HELICOPTER WEIGHT MEASURING SYSTEM

[75] Inventor: Charles D. Bateman, Bellevue, Wash.

[73] Assignee: Sundstrand Data Control, Inc., Rockford, Ill.

[21] Appl. No.: 481,487

[22] Filed: Apr. 1, 1983

[51] Int. Cl.$^4$ .................... G01G 19/00; G06F 15/20
[52] U.S. Cl. .................................. 364/567; 244/17.11
[58] Field of Search .............. 364/463, 466, 567, 715; 73/65; 340/945, 946, 970, 977; 177/25; 244/17.11

[56] References Cited

U.S. PATENT DOCUMENTS

| | | | |
|---|---|---|---|
| 3,701,279 | 10/1972 | Harris et al. | 73/65 |
| 3,754,440 | 8/1973 | Edgerton et al. | 364/567 |
| 4,110,605 | 8/1978 | Miller | 364/463 |
| 4,115,755 | 9/1978 | Cotton | 340/946 |
| 4,312,042 | 1/1982 | Bateman | 364/463 |
| 4,463,428 | 7/1984 | Gilliam | 364/567 |
| 4,490,802 | 12/1984 | Miller | 340/945 |

Primary Examiner—Gary Chin
Attorney, Agent, or Firm—Wood, Dalton, Phillips, Mason & Rowe

[57] ABSTRACT

A helicopter weight measuring system for detecting the loaded weight of a helicopter operating under partial or full hover conditions while the wheels of the helicopter are contacting the ground includes means for sensing loading on the landing gear of the helicopter and means for determining the lift produced by a rotating wing of the helicopter. The sensed loading on the landing gear is added to the calculated lift to produce an indication of total helicopter loading.

7 Claims, 3 Drawing Figures

4,574,360

HELICOPTER WEIGHT MEASURING SYSTEM

DESCRIPTION

1. Technical Field

The present invention relates to aircraft weight measuring systems and more particularly to an on-board weight measuring system for a helicopter which provides a reliable indication of the weight or loading of the helicopter even during periods when lift is developed by the rotating wing thereof.

2. Background Art

A prior type of aircraft weight measuring system is disclosed in Bateman U.S. Pat. No. 4,312,042, assigned to the assignee of the instant application. The system includes pairs of accelerometers which are mounted on the weight-supporting member of each landing gear so as to sense the deflection in the member caused by the application of the weight of the aircraft thereto. The outputs of the accelerometers are combined to cancel the effects of runway slope or irregularities and to generate an accurate indication of the weight of the aircraft.

Such a system is effective to detect the loaded weight of an aircraft when the aircraft is stationary on the ground and does not experience any lift. However, in the case of a helicopter having a rotating wing, it is possible that the helicopter will be loaded and/or weighed during the time the rotating wing is imparting lift to the helicopter. During this time, even though the helicopter may still be on the ground, the weight sensed by the pairs of accelerometers on the landing gear is inaccurate since part of the loading on the landing gear is relieved by the lift caused by the rotating wing. Such an inaccuracy may lead to a dangerous loading condition for the helicopter.

SUMMARY OF THE INVENTION

In accordance with the present invention, a weight measuring system for a helicopter includes means for generating a representation of the load supported by the landing gear, means for generating a representation of the lift developed by a rotating wing of the helicopter and means for generating an indication of the weight of the helicopter from the representation of the load on the landing gear and the lift.

The means for generating an indication of lift includes first and second pressure sensors, the outputs of which are averaged and multiplied by a constant and the effective disc area of the rotating wing of the helicopter to calculate lift.

The weight of the helicopter supported by the landing gear is detected by pairs of acccelerometers mounted on weight supporting members of the landing gear so as to detect the deflection thereof. The outputs from each pair of accelerometers are combined together to derive an indication of the load supported by each respective landing gear. The outputs from the pairs of accelerometers are then added together to generate an indication of the total weight supported by all of the landing gears.

The total weight sensed by the landing gear accelerometers is added to the lift to derive an indication of total helicopter weight. The weight measuring system of the present invention provides an accurate indication of aircraft loading regardless of the tilt or inclination of the ground upon which the aircraft is resting.

DESCRIPTION OF THE PREFERRED EMBODIMENT

Figure 1:
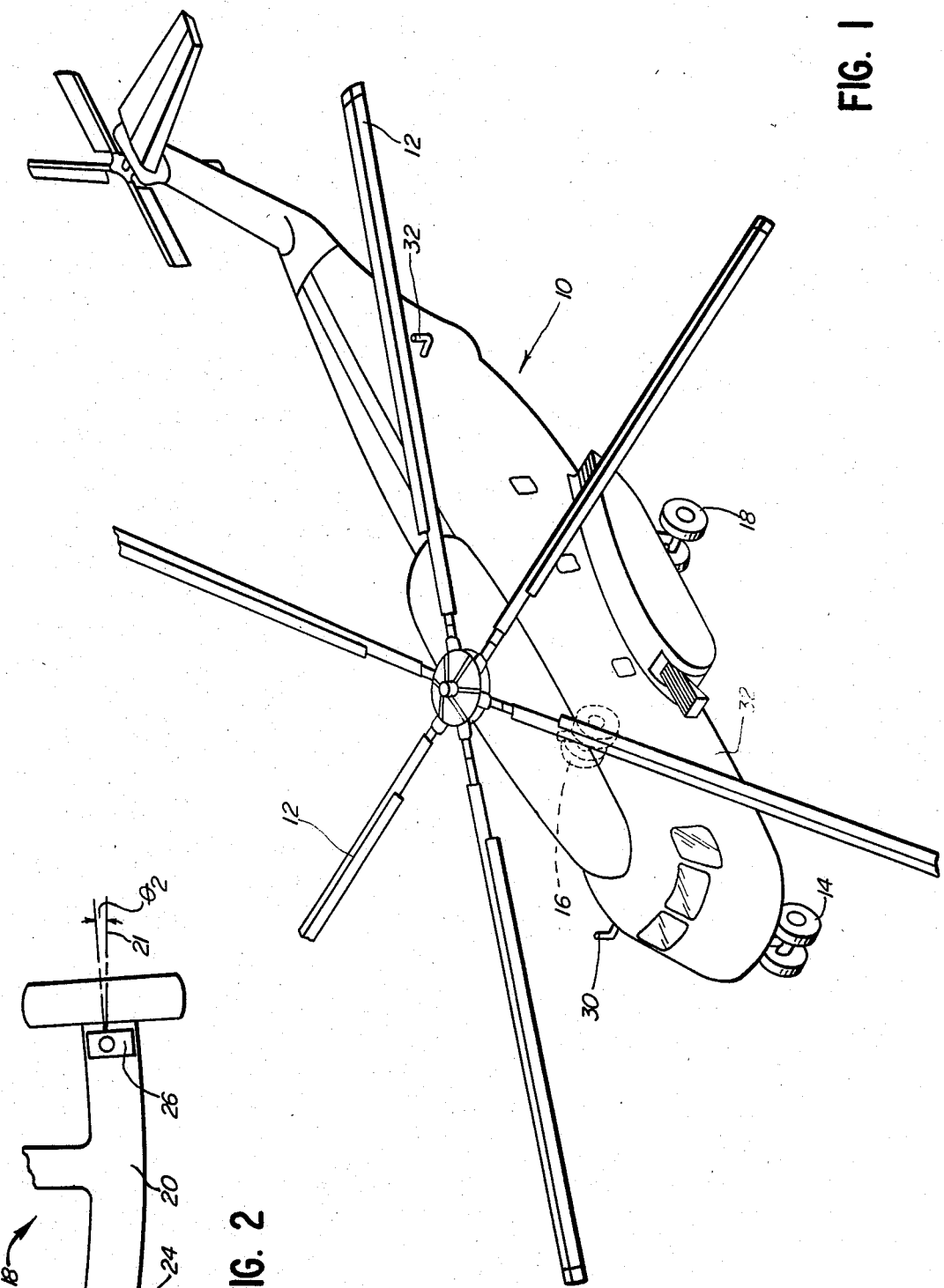
FIG. 1 is a perspective view of a helicopter in conjunction with a portion of the helicopter weight measuring system of the present invention.

Referring now to FIG. 1, there is illustrated a helicopter 10 having a rotating wing 12 which develops lift when rotated. The helicopter 10 also includes a nose gear 14 and right and left main gears 16,18, respectively. The total weight of the helicopter 10, when no thrust is developed by the rotating wing 12, is equal to the total weight supported by the three landing gears 14, 16,18. When, however, the rotating wing 12 develops lift, i.e. when the helicopter is hovering, the total weight of the aircraft is no longer equal to the sum of the weights supported by the landing gears. In this instance, total weight is given by the following equation:

$$W_T = W_{NG} + W_{RG} + W_{LG} + L \tag{1}$$

where $W_T$ equals total weight, $W_{NG}$ equals the weight supported by the nose gear 14, $W_{RG}$ is the weight supported by the right main gear 16, $W_{LG}$ is the weight supported by the left main gear 18 and L is the lift imparted by the helicopter rotating wing 12.

The weight supported by each of the landing gears 14,16,18 may be determined by the apparatus disclosed in Bateman U.S. Pat. No. 4,312,042, the disclosure of which is incorporated by reference. A brief description of this system follows, it being understood that a more detailed description is available in the noted patent.

Figure 2:
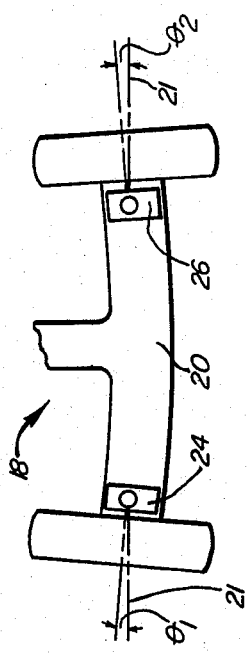
FIG. 2 is a diagrammatic view of the left landing gear shown in FIG. 1.

The weight or load supported by each landing gear 14,16,18 is determined by sensing the amount of deflection or bend in a structural weight supporting member, for example an axle of the landing gear. The angle of bending of this structural member is proportional to the weight or force on the member. Referring specifically to the schematic view of the left main gear 18 shown in FIG. 2, an axle 20 is shown with an exaggerated bend to illustrate the effect of loading thereon. An inertial reference plane is indicated by a horizontal broken line 21. The angle of bending of the axle is represented by the reference angles $\theta_1$ and $\theta_2$.

A pair of accelerometers 24,26 are mounted within the axle 20 at opposite ends thereof so as to sense the angles $\theta_1$ and $\theta_2$. The angles $\theta_1$ and $\theta_2$ in turn include the following components:

$$\theta_1 = \theta_B + \theta_{L1} + \theta_{A1} \tag{2}$$

$$\theta_2 = -\theta_B + \theta_{L2} + \theta_{A2} \tag{3}$$

In the foregoing equations, $\theta_B$ is the angle of the axle caused by inclination of the ground upon which the helicopter is resting. $\theta_{L1}$ and $\theta_{L2}$ are the beam bend angles caused by a load. $\theta_{A1}$ and $\theta_{A2}$ are sensor axis misalignment and bias terms.

The weight supported by the axle 20 is given by the following formula:

$$W_A = K(\theta_{L1} + \theta_{L2}) \tag{4}$$

From the foregoing, it can be seen that the weight on the axle is proportional to the $\theta_L$ components of the total measured angles $\theta_1$ and $\theta_2$. K is a scale factor which depends on axle geometry and strength and is generally an empirically known quantity. In order to derive the total weight carried by the axle 20, the outputs of the accelerometers 24,26 are summed by a computer 28, shown in FIG. 3, which also stores the factor K in a memory 29 and multiplies it with the summed angles $\theta_1$ and $\theta_2$. The resultant quantity is independent of the angle component $\theta_B$ and hence the computed weight is unaffected by the inclination of the ground upon which the helicopter rests. Further, the angle factors $\theta_A$ are measured and cancelled during automatic zeroing of the system and hence do not interfere with the calculation. In summary, the summing of the outputs of the accelerometers 24,26 provides an indication of the load carried by the axle 20.

Figure 3:
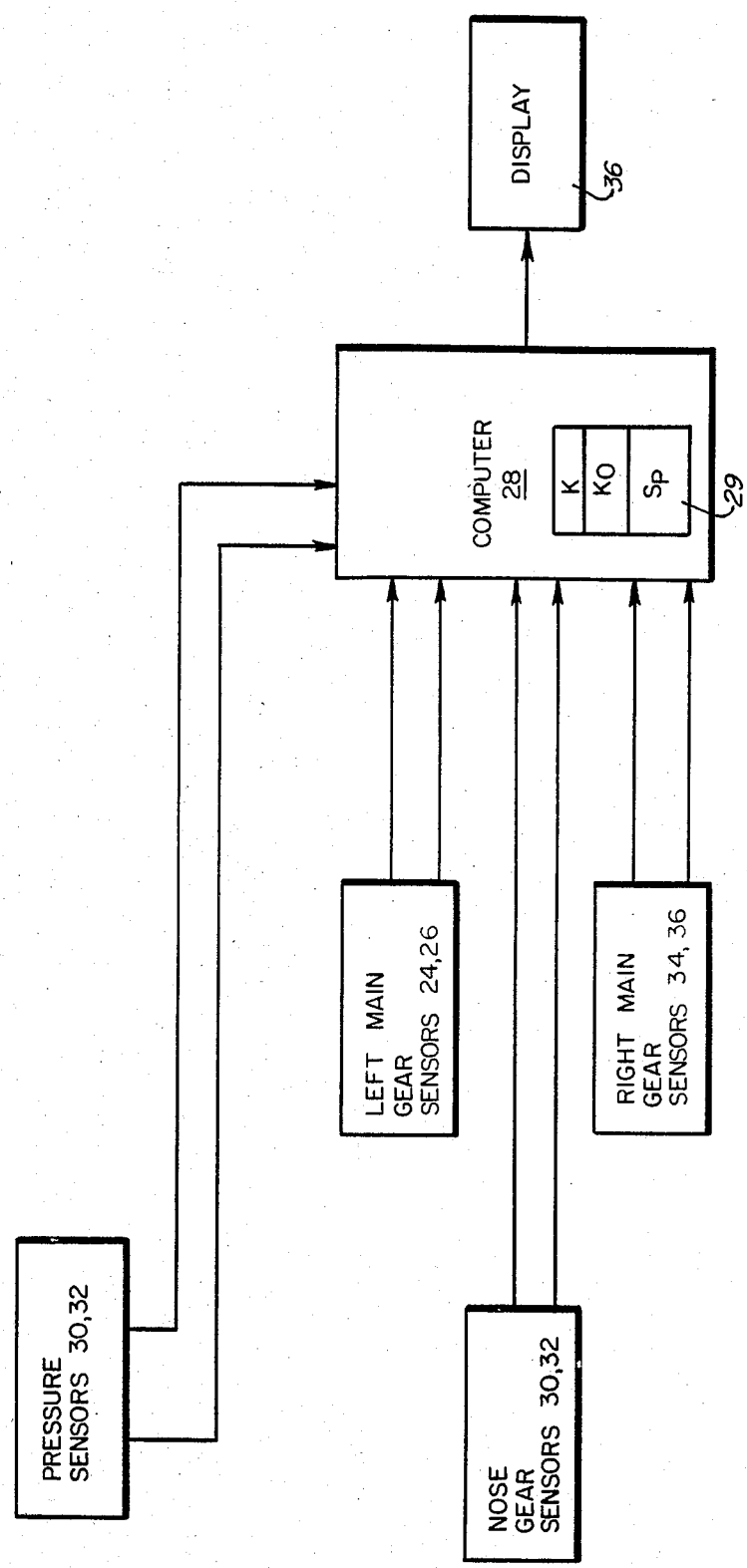
FIG. 3 is a block diagram of the helicopter weight measuring system of the present invention.

As seen specifically in FIG. 3, outputs from accelerometers 30,32 disposed in the axle of the nose gear 14 and accelerometers 34,36 disposed in the axle of the right main gear 16 are coupled to the computer 28. The computer 28 calculates the weight on each of the gears 14,16 and adds the three axle weights together to generate an indication of total helicopter weight supported by the landing gear.

The computer 28 also derives an indication of the lift imparted by the rotating wing 12 from fore and aft pressure sensors 30,32, seen more specifically in FIG. 1. Each of the pressure sensors 30,32 is disposed on the fuselage 32 of the helicopter 10, beneath the rotating wing 12. In the preferred embodiment, the pressure sensors 30,32 are pitot tubes which detect the difference between the dynamic air pressure and the static air pressure to generate an indication of the slipstream pressure, denoted $P_{TS}$, caused by movement of the rotating wing 12.

The lift L developed by the rotating wing 12 is given by the equation:

$$L = q_c C_L S_P \tag{5}$$

where $q_c$ is the dynamic pressure, $C_L$ is the coefficient of lift and $S_P$ is the effective rotating wing disc area.

The lift coefficient $C_T$ is proportional to the total pressure, designated $P_T$. In other words:

$$C_L = K_O P_T \tag{6}$$

where $K_O$ is a constant which is empirically determined for each type of helicopter with which the system is used.

The total pressure $P_T$ is given by the following equation:

$$P_T = \frac{P_{TS} - P_{TD}}{q_c} \tag{7}$$

where $P_{TD}$ is the free stream total pressure which occurs as a result of a movement of a helicopter in air.

By substituting equations (7) and (6) into equation (5):

$$L = K_O(P_{TS} - P_{TD}) S_P \tag{8}$$

Since the weight measuring system is intended to be effective only at those times that the helicopter is stationary on the ground under a condition of partial or full hover, the term $P_{TD}$ representing the free stream total pressure is equal to zero. Accordingly, the equation for total thrust becomes:

$$L = K_O P_{TS} S_P \tag{9}$$

The effective disc area $S_P$ of the rotating wing 12 is calculated for the particular type of aircraft with which the weight measuring system is used and is stored with the constant $K_O$ in the memory 29 of the computer 28. The effective disc area is equal to:

$$\tfrac{1}{4}\pi(D_1^2 - D_2^2)$$

where $D_1$ is the outer diameter and $D_2$ is the inner diameter of the useful area of the rotating wing.

In practice, the rotating wing slipstream pressure $P_{TS}$ is determined from an average of the outputs of the pressure sensors 30,32. In other words, the outputs from the pressure sensors 30,32, designed $P_{TS1}$ and $P_{TS2}$ are added together and divided by two by the computer 28 to obtain the average thereof, with this average being inserted in the equation (9). The computer 28 then solves the equation (9) to calculate the total lift developed by the rotating wing 12.

A display 36 disposed in the helicopter 10 may be connected to and controlled by the computer 28 to generate a visual or other indication of loading of the helicopter to an operator of the aircraft.

By averaging the output of the pressure sensors 30,32, the value of lift calculated by the computer 28 is substantially independent of the attitude of the rotating wing 12 and the inclination of the ground upon which the helicopter 10 is resting. Further, the calculated lift is substantially independent of aerodynamic losses and mechanical transmission power losses.

I claim:

1. A weight measuring system for a helicopter having a set of landing gear and a rotating wing for imparting lift having an effective disc area, comprising:
   first means for generating a representation of the load supported by the set of landing gear;
   second means including a pressure sensor having an output representing the slipstream pressure developed by the rotating wing, a memory for storing a representation of said effective disc area and means coupled to said pressure sensor and said memory for generating a representation of said lift from said slipstream pressure and said effective disc area; and
   third means coupled to said first and second means for calculating an indication of the total weight of the helicopter from said load supported by the set of landing gear and said lift.

2. The weight measuring system of claim 1, wherein said third means includes a computer for adding said load to said lift.

3. The weight measuring system of claim 1, wherein the lift generating means comprises a computer which calculates the lift developed by the rotating wing according to the equation:

$$L = K_O P_{TS} S_P$$

where L is the lift, $P_{TS}$ is the slipstream pressure, $S_P$ is the effective disc area and $K_O$ is a constant.

4. The weight measuring system of claim 1, wherein said pressure sensor comprises a pitot tube.

5. The weight measuring system of claim 1, wherein said pressure sensor comprises first and second pitot tubes disposed beneath the rotating wing each having an output and means for averaging the outputs of the pitot tubes to generate the slipstream pressure representation.

6. The weight measuring system of claim 1, further including a display coupled to said third means for developing a visual indication of the total weight of the helicopter.

7. In a helicopter having a landing gear, accelerometers mounted on the landing gear, a rotating wing for imparting lift and having an effective disc area and a pressure sensor which develops an output representative of slipstream pressure. a method of deriving the weight of the helicopter comprising:
  causing the accelerometers to generate an indication of the weight supported by the landing gear;
  storing a representation of said effective disc area in a memory;
  generating a representation of said lift from said slipstream pressure and said effective disc area representation; and
  computing the weight of the helicopter by adding said indicated weight supported by the landing gear to said representation of the lift.

* * * * *